(12) United States Patent
Choi et al.

(10) Patent No.: US 10,887,683 B1
(45) Date of Patent: Jan. 5, 2021

(54) ELECTRONIC APPARATUS INCLUDING SPEAKER MODULE

(71) Applicant: LG ELECTRONICS INC., Seoul (KR)

(72) Inventors: Byungkil Choi, Seoul (KR); Janghwan Shim, Seoul (KR); Jinhyung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/732,017

(22) Filed: Dec. 31, 2019

(30) Foreign Application Priority Data

Oct. 24, 2019 (WO) ................ PCT/KR2019/014091

(51) Int. Cl.
| H04R 1/02 | (2006.01) |
| H04R 9/06 | (2006.01) |
| H04R 1/28 | (2006.01) |
| H04B 1/3827 | (2015.01) |

(52) U.S. Cl.
CPC ........... *H04R 1/2826* (2013.01); *H04R 1/028* (2013.01); *H04B 1/3827* (2013.01); *H04R 2400/11* (2013.01); *H04R 2499/11* (2013.01); *H04R 2499/15* (2013.01)

(58) Field of Classification Search
CPC .............................. H04R 1/2826; H04R 1/028
See application file for complete search history.

(56) References Cited

U.S. PATENT DOCUMENTS

| 2011/0077053 | A1* | 3/2011 | Lee ..................... | H04M 1/0237 455/566 |
| 2016/0234362 | A1* | 8/2016 | Moon .................. | H04M 1/185 |
| 2016/0334836 | A1 | 11/2016 | Hong et al. | |
| 2019/0208044 | A1* | 7/2019 | Lee ..................... | H01L 27/3227 |
| 2019/0310686 | A1* | 10/2019 | Lee ..................... | G06F 1/1681 |
| 2019/0384438 | A1* | 12/2019 | Park ..................... | G06F 1/1652 |
| 2020/0076940 | A1* | 3/2020 | Kim ..................... | H04M 1/6016 |
| 2020/0167015 | A1* | 5/2020 | Fukutome ............ | G02B 6/0031 |
| 2020/0249722 | A1* | 8/2020 | Cha ..................... | G06F 1/1652 |
| 2020/0249834 | A1* | 8/2020 | Seo ..................... | G06F 3/04847 |
| 2020/0264660 | A1* | 8/2020 | Song ..................... | G06F 1/1624 |

FOREIGN PATENT DOCUMENTS

| KR | 1020140051720 | 5/2014 |
| KR | 1020140147497 | 12/2014 |
| KR | 1020180006550 | 1/2018 |
| KR | 1020180097356 | 8/2018 |

OTHER PUBLICATIONS

PCT International Application No. PCT/KR2019/014091, International Search Report dated Jul. 23, 2020, 4 pages.

* cited by examiner

*Primary Examiner* — Simon King
(74) *Attorney, Agent, or Firm* — Lee, Hong, Degerman, Kang & Waimey

(57) ABSTRACT

Disclosed is an electronic apparatus includes a first frame, a second frame configured to move relative to the first frame, a flexible display having a screen output area viewable on a front surface of the electronic apparatus to be expanded or reduced based on a movement of the second frame, a speaker module disposed at the first frame and having a sound emitting hole and a vent hole on one surface, and a pipe rail disposed at the second frame. The pipe rail may selectively transfer an acoustic signal output through the vent hole to outside through an inner pipeline based on the movement of the second frame. However, embodiments are not limited thereto.

20 Claims, 12 Drawing Sheets

ELECTRONIC APPARATUS INCLUDING SPEAKER MODULE

CROSS-REFERENCE TO RELATED APPLICATION

Pursuant to 35 U.S.C. § 119(a), this application claims the benefit of earlier filing date and right of priority to PCT International Application No. PCT/KR2019/014091, filed on Oct. 24, 2019, the contents of which are hereby incorporated by reference herein in its entirety.

BACKGROUND

1. Field

This disclosure relates to an electronic apparatus including a speaker module.

2. Description of the Related Art

Recently, with developments of digital technologies, various types of electronic devices such as a mobile communication terminal, a smartphone, a tablet personal computer (PC), a notebook, a personal digital assistant (PDA), a wearable device, or a digital camera are widely used.

As performances of the electronic devices are improved, a desire for a large-area display that more efficiently provides various functions has increased. Meanwhile, the electronic device is required to be smaller and thinner to achieve increased portability, which conflicts with a typical electronic device having a large-area display.

Accordingly, research is conducted on an electronic device equipped with a flexible display (e.g., a rollable display) having a sufficient elasticity such that at least a portion of the display is folded or rolled when being carried and unfolded or spread to be used as necessary.

SUMMARY

In a case in which a specific function is executed through a large-area display of an electronic device, for example, a case in which a user is to watch a movie or play a game using the electronic device, a user's desire for experiencing an improved acoustic performance in comparison to a general display may increase.

However, a typical electronic apparatus may be difficult to secure a sufficient resonating space of sound provided from a speaker module due to spatial restrictions. To secure the sufficient resonating space, an overall size of the electronic apparatus may increase and thus, may be degraded in portability.

Example embodiments of the present disclosure are to provide an electronic apparatus for providing an improved acoustic performance using a structural feature of a flexible display.

According to an aspect, there is provided an electronic apparatus including a first frame, a second frame configured to move relative to the first frame, a flexible display having a screen output area viewable on a front surface of the electronic apparatus to be expanded or reduced based on a movement of the second frame, a speaker module fixedly disposed at the first frame and having a sound emitting hole and a vent hole on one surface, and a pipe rail fixedly disposed at the second frame. The pipe rail is configured to selectively transfer an acoustic signal output through the vent hole to outside through an inner pipeline based on the movement of the second frame.

The pipe rail may include one or more input holes formed in a first surface facing the speaker module and an output hole formed in a second surface facing an outer surface of the electronic apparatus.

When the screen output area is reduced, the pipe rail may be located to close the vent hole. When the screen output area is expanded, the pipe rail may be located such that the acoustic signal is transferred from the vent hole through the inner pipeline to outside.

The pipe rail may be configured to differently provide an acoustic output path of the acoustic signal transferred from the vent hole to outside based on an expansion degree of the screen output area.

When the screen output area is expanded based on the movement of the second frame, the pipe rail may be located such that one of the one or more input holes overlaps the vent hole.

The pipe rail may form an acoustic output path corresponding to a length from an input hole overlapping the vent hole to the output hole.

When the screen output area is reduced, the electronic apparatus may output an acoustic signal through the sound emitting hole. When the screen output area is expanded, the electronic apparatus may output an acoustic signal through the sound emitting hole and the output hole.

A length between the output hole and the vent hole may be greater than a length between the vent hole and the one or more input holes.

One surface of the speaker module having the sound emitting hole and the vent hole may be disposed to face a side surface of the electronic apparatus.

The pipe rail may include an input hole on a first surface facing the speaker module and a plurality of output holes on a second surface facing an outer surface of the electronic apparatus. The electronic apparatus may selectively open at least a portion of the plurality of output holes based on an expansion degree of the screen output area in accordance with a movement of the second frame.

According to another aspect, there is also provided an electronic apparatus including a first frame, a second frame configured to move relative to the first frame, a flexible display having a screen output area viewable on a front surface of the electronic apparatus to be expanded or reduced based on a movement of the second frame, a speaker module fixedly disposed on the first frame and having a sound emitting hole and a vent hole on one surface, and a pipe rail fixedly disposed at the second frame. The pipe rail may be configured to differently provide an output path of an acoustic signal transferred from the vent hole through an inner pipeline of the pipe rail to outside based on an expansion degree of the screen output area.

The pipe rail may include a plurality of input holes on a first surface facing the speaker module and at least one output hole on a second surface facing an outer surface of the electronic apparatus.

Based on the expansion degree of the flexible display, the pipe rail may be located such that one of the plurality of input holes overlaps the vent hole.

The output path of the acoustic signal transferred from the vent hole to outside may include an inner pipeline from an input hole overlapping the vent hole to at least one output hole.

The pipe rail may be located such that the output path of the acoustic signal increases in length according to an increase in a size of the screen output area increases.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
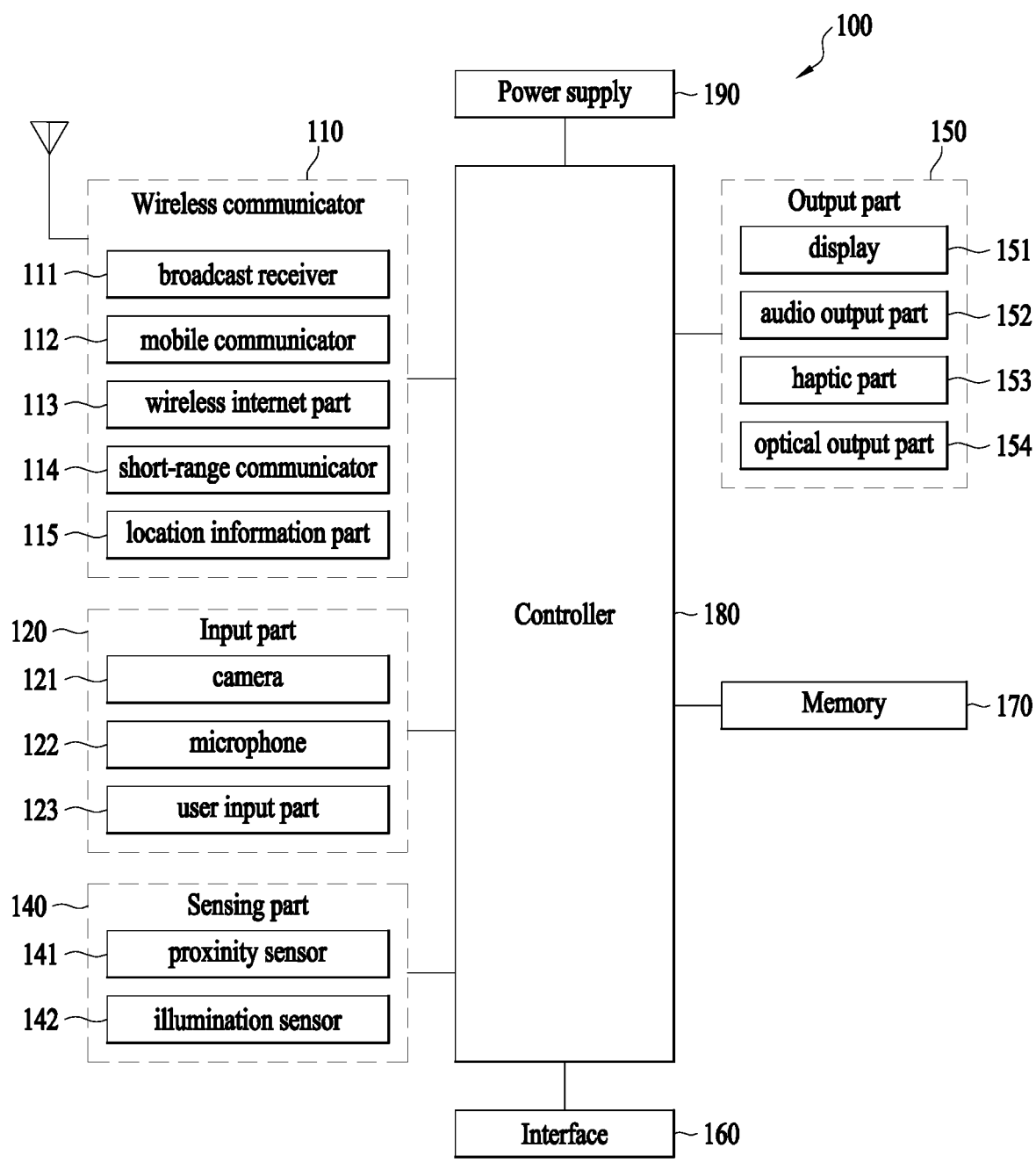
FIG. 1 is a block diagram illustrating an electronic apparatus according to various embodiments.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the concept of the invention, and therefore, they should not be construed to limit the technological concept disclosed herein by the accompanying drawings.

The terms 'first', 'second', etc. may be used to describe various components, but the components are not limited by such terms. The terms are used only for the purpose of distinguishing one component from other components.

When an arbitrary component is described as "being connected to" or "being linked to" another component, this should be understood to mean that still another component(s) may exist between them, although the arbitrary component may be directly connected to, or linked to, the corresponding other component. In contrast, when an arbitrary component is described as "being directly connected to" or "being directly linked to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

An electronic device according to various embodiments may include at least one of a mobile phone, a smartphone, a laptop computer, a digital broadcasting terminal, personal digital assistants (PDA), a portable multimedia player (PMP), a navigator, a slate PC, a tablet PC, an ultrabook, a wearable device (e.g., smartwatch), a smart glass, a head-mounted display (HMD), a digital TV, a desktop computer, or a digital signage.

FIG. 1 is a block diagram illustrating an electronic apparatus according to various embodiments.

Referring to FIG. 1, an electronic apparatus 100 may include at least one of a wireless communicator 110, an input part 120, a sensing part 140, an output part 150, an interface 160, a memory 170, a controller (or processor) 180, and a power supply 190.

The electronic apparatus 100 may include other components in addition to the components of FIG. 1 and may also include some of the components of FIG. 1.

The wireless communicator 110 may include at least one module that enables wireless communication to be performed between the electronic apparatus 100 and a wireless communication system, between the electronic apparatus 100 and another electronic apparatus (not shown) (e.g., the electronic apparatus 100), or between the electronic apparatus 100 and an external server. The wireless communicator 110 may include one or more modules that connect the electronic apparatus 100 to one or more networks. The wireless communicator 110 may include at least one of a broadcast receiver 111, a mobile communicator 112, a wireless internet part 113, a short-range communicator (NFC) 114, and a location information part 115.

The input part 120 may include at least one of an image input part (for example, a camera 121) that receives an image signal input, an audio input part (for example, a microphone 122) that receives an audio signal input, or a user input part 123 that receives a user input. For example, the user input part 123 may receive a user touch input through a touch sensor (or touch panel) provided in a display 151 or receive a user input through a mechanical key. Information collected in the input part 120 (for example, voice data and image data) may be analyzed and processed as a control command of a user.

The sensing part 140 may include one or more sensors to sense at least one of information in the electronic apparatus 100, surrounding environment information of the electronic apparatus 100, or user information.

For example, the sensing part 140 may include at least one of a proximity sensor 141, an illumination sensor 142, a touch sensor, or a finger scan sensor. In addition, the sensing part 140 may include at least one of an acceleration sensor, a magnetic sensor, a gravity (G)-sensor, a gyroscope sensor, a motion sensor, an RGB sensor, an infrared (IR) sensor, an ultrasonic sensor, an optical sensor, a battery gauge, an environment sensor (for example, a barometer, a hygrometer, a thermometer, a radioactivity sensor, a heat sensor, and a gas detection sensor), or a chemical sensor (for example, an electronic nose, a healthcare sensor, and a biometric sensor).

In the present disclosure, the electronic apparatus 100 may use a combination of pieces of information sensed in at least two sensors among the aforementioned sensors.

The output part 150 may output information related to visual, auditory, or tactile. For example, the output part 150 may include at least one of the display 151, an audio output part 152, a haptic part 153, or an optical output part 154.

In one example embodiment, the display 151 may form a layer structure or an integrated structure with a touch sensor to implement a touch screen that simultaneously provides a touch input function and a screen output function. For example, the touch screen may function as the user input part 123 that provides an input interface between the electronic apparatus 100 and a user and may function as the output part 150 that provides an output interface between the electronic apparatus 100 and the user.

The audio output part 152 may externally output audio data stored in the memory 170 or received from the wireless communicator 110 in a call signal reception, a call mode or a recording mode, a voice recognition mode, a broadcast reception mode, or the like. The audio output part 152 may output an acoustic signal associated with a function (for example, a call signal reception sound and a message reception sound) performed in the electronic apparatus 100. For example, the audio output part 152 may include at least one of a receiver, a speaker (e.g., a speaker module 300 of FIG. 4), or a buzzer.

The haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the controller 180. For example, the haptic part 153 may output a combination of different vibrations or output different vibrations in sequence.

The optical output part 154 may output a signal to announce an event occurrence using light of a light source of the electronic apparatus 100. For example, an event occurring in the electronic apparatus 100 may include at least one of message reception, call signal reception, missed call, alarm, schedule notification, e-mail reception, and application-based information reception.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform a control or a function associated with the connected external device.

The memory 170 may store data related to various functions of the electronic apparatus 100. For example, the memory 170 may store application programs (or applications) run in the electronic apparatus 100, data for operation of the electronic apparatus 100, and instructions. As an example, at least a portion of the application programs may be downloaded from an external server through wireless communication. As another example, at least a portion of the application programs may be previously stored in the memory 170 for a function (for example, call forwarding and outgoing function and message receiving and outgoing function) of the electronic apparatus 100. The application program stored in the memory 170 may be run to perform a predetermined operation (or function) of the electronic apparatus 100 based on the controller 180.

The controller 180 (e.g., processor) may control an overall operation of the electronic apparatus 100. For example, the controller 180 may process a signal, data, information, and the like input or output through components of the electronic apparatus 100 or run the application program stored in the memory 170, thereby providing information to a user or performing a predetermined function.

For example, to run the application program stored in the memory 170, the controller 180 may control at least a portion of the components of the electronic apparatus 100 of FIG. 1. To run the application program, the controller 180 may operate a combination of two or more components among the components included in the electronic apparatus 100.

The power supply 190 may supply power to each component included in the electronic apparatus 100 by receiving external or internal power based on a control of the controller 180. The power supply 190 may include a battery. The battery may include a built-in battery or a removable battery.

At least a portion of the aforementioned components of the electronic apparatus 100 may operate in cooperation with each other to implement an operation, a control, or a control method of the electronic apparatus 100 according to various embodiments as described below. Also, the operation, control, or control method of the electronic apparatus 100 may be embodied by running at least one application program stored in the memory 170.

The electronic apparatus 100 may be in a bar shape. However, embodiments are not limited thereto. The electronic apparatus 100 may have various shapes within the scope of not contradicting features of the present disclosure.

The electronic apparatus 100 may include a rollable, foldable, and flexible display as the display 151.

For example, a flexible display (e.g., the display 151) may be manufactured on a thin and flexible substrate so as to be curved, bendable, folded, twisted, or rolled like a paper while having a characteristic of a typical flat panel display.

The flexible display may implement a flexible touch screen in combination with a touch sensor. For example, the controller 180 may sense a touch input through the flexible touch screen and perform various functions corresponding to the touch input.

In an example, the electronic apparatus 100 may further include a deformation detecting module that detects a deformation of the flexible display. The electronic apparatus 100 may detect the deformation of the flexible display using at least one component of the sensing part 140. For example, the controller 180 may output information displayed on the flexible display by changing the information or generate a predetermined control signal based on the deformation of the flexible display detected through at least one of the deformation detecting module or the sensing part 140.

State deformation of the flexible display, for example, an expansion or reduction of a screen output area viewable on a front surface of the electronic apparatus 100 may occur based on an external force applied by a user but not be limited thereto. The electronic apparatus 100 may change a state of the flexible display (for example, expand or reduce the screen output area) based on an input through the input part 120 or a predetermined application command. For this, the electronic apparatus 100 may include a driver (not shown).

According to an example embodiment, the electronic apparatus 100 may include an antenna (e.g., an antenna on display) on the flexible display. For example, the antenna on display may be in a form of a transparent film in which an electrode layer including a pattern and a dielectric layer are laminated. The antenna on display may be implemented to be thinner than a laser direct structuring (LDS) antenna implemented through copper nickel plating, have a low thickness dependency, and be invisible on appearance.

Figure 2A:
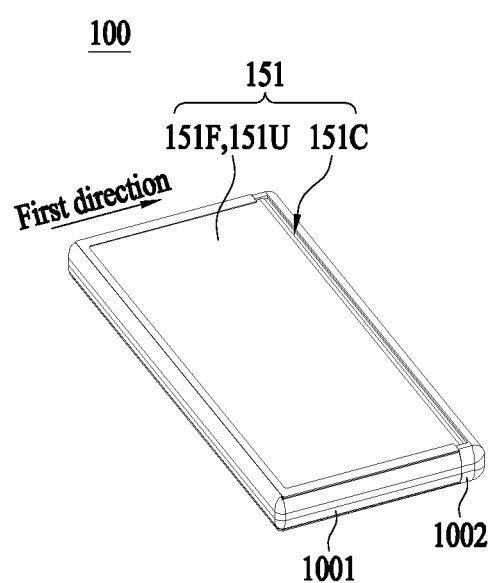
FIG. 2A is a front perspective view illustrating an electronic apparatus according to an example embodiment.
Figure 2B:
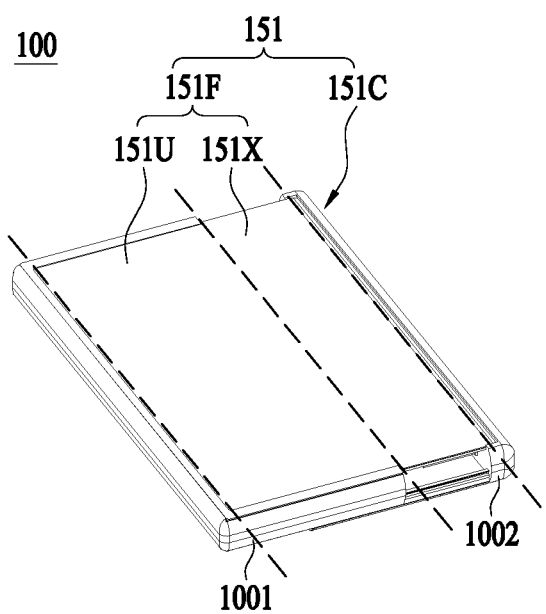
FIG. 2B is a front perspective view illustrating an electronic apparatus according to an example embodiment.
Figure 3A:
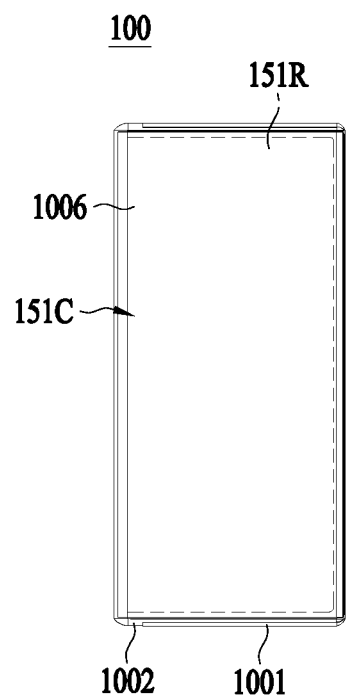
FIG. 3A is a rear view illustrating an electronic apparatus according to an example embodiment.
Figure 3B:
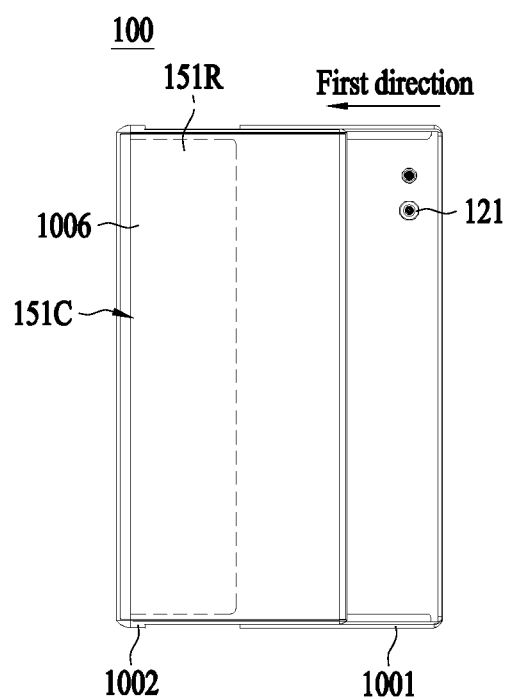
FIG. 3B is a rear view illustrating an electronic apparatus according to an example embodiment.

FIGS. 2A and 2B are front perspective views illustrating the electronic apparatus 100 according to an example embodiment of the present disclosure and FIGS. 3A and 3B are rear views illustrating the electronic apparatus 100 according to an example embodiment of the present disclosure.

Referring to FIGS. 2A through 3B, the electronic apparatus 100 may include a flexible type display, for example, the display 151 of FIG. 1 having an expandable or reducible screen output area (e.g., a front face area 151F) viewable on a front surface.

For example, the display 151 may be bent or folded about a bending or folding axis (e.g., a winding portion 151C). Also, in response to the bending or folding axis moving, the screen output area viewable on the front surface of the electronic apparatus 100 may be expanded or reduced.

FIGS. 2A and 3A illustrate a reduced screen output area on the front surface of the electronic apparatus 100. FIGS. 2B and 3B illustrate an expanded screen output area on the front surface of the electronic apparatus 100.

The display 151 may include a front surface area 151F facing the front surface (a first surface) of the electronic apparatus 100, a rear surface area 151R facing a rear surface (a second surface) of the electronic apparatus 100, and the winding portion 151C between the front surface area 151F and the rear surface area 151R.

The front surface area 151F of the display 151 may include a fixed area 151U and a variable area 151X. The fixed area 151U may be an area to be viewed at the front surface even when the screen output area on the front surface of the electronic apparatus 100, that is, the front surface area 151F is maximally reduced. The variable area 151X may include an area to be additionally viewed at the front surface of the electronic apparatus 100 in accordance with the expansion of the front surface area 151F. A size of the variable area 151X may vary based on a degree to which the bending or folding axis of the display 151 moves.

According to various embodiments, the electronic apparatus 100 may include frame elements for moving the bending or folding axis of the display 151.

For example, the electronic apparatus 100 may include a first frame 1001 that supports the fixed area 151U based on the fixed area 151U. Also, the electronic apparatus 100 may include a second frame 1002 that moves relative to the first frame 1001.

The second frame 1002 may support the variable area 151X based on the variable area 151X. When the front surface area 151F is in a reduced state, the first frame 1001 and the second frame 1002 may be located to overlap each other.

For example, the second frame 1002 may relatively move in a first direction in which a distance from the first frame 1001 increases, thereby withdrawing at least a portion of the variable area 151X forwardly. In this example, a size of the front surface area 151F may increase and a size of the rear surface area 151R may be reduced.

Conversely, when the second frame 1002 relatively moves in a direction in which the distance from the first frame 1001 decreases, that is, in opposition to the first direction, the variable area 151X may be rolled into the rear surface of the electronic apparatus 100. In this example, the front surface area 151F may be reduced and the rear surface area 151R may be expanded.

The rear surface area 151R may be viewable on the rear surface of the electronic apparatus 100 through a rear window 1006 having a light transmittance.

On a rear surface of the electronic apparatus 100, predetermined image information may be output in the rear surface area 151R.

As described above, when the second frame 1002 relatively moves to be apart from the first frame 1001, a size of the rear surface area 151R in which image information is output on the rear surface of the electronic apparatus 100 may be reduced.

When the second frame 1002 overlapping the first frame 1001 moves, a portion of the first frame 1001 may be externally viewable at the rear surface of the electronic apparatus 100. In this example, the camera 121 located on the first frame 1001 may also be externally viewable.

FIGS. 4 through 7 are block diagrams illustrating an operation of an electronic apparatus according to an example embodiment of the present disclosure.

Figure 4:
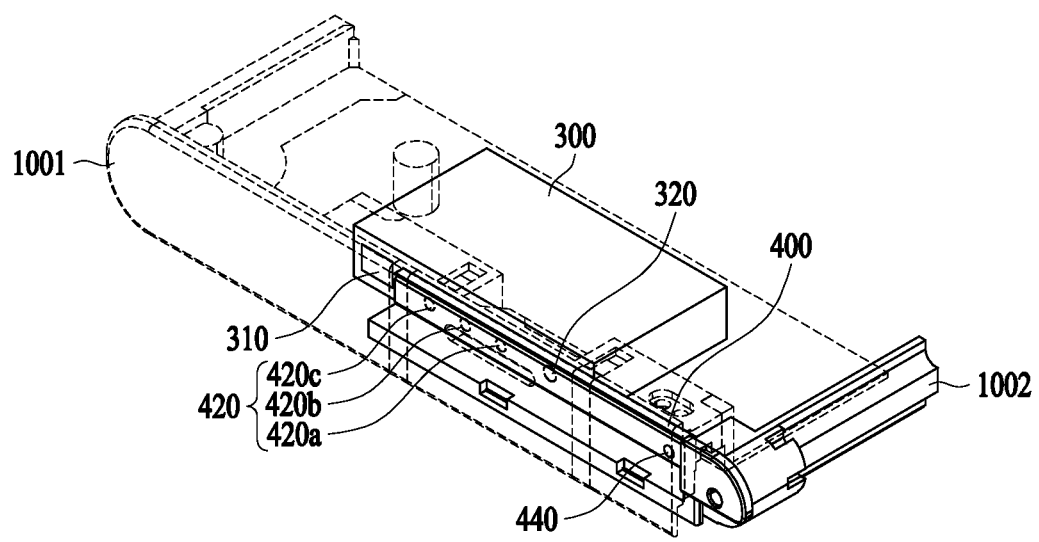
FIG. 4 is a perspective view illustrating an operation of an electronic apparatus according to an example embodiment.
Figure 7:
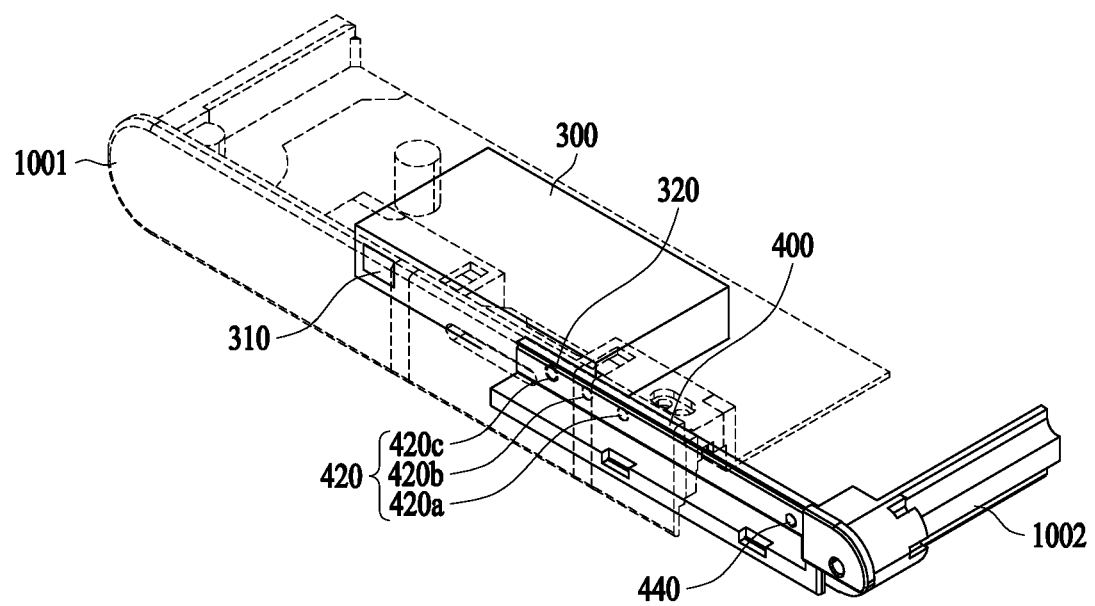
FIG. 7 is a perspective view illustrating an operation of an electronic apparatus according to an example embodiment.

FIG. 4 illustrates a state in which a screen output area on a front surface of the electronic apparatus 100 is reduced according to an example embodiment and, for example, may correspond to FIGS. 2A and 3A. FIG. 7 illustrates a state in which a screen output area on a front surface of the electronic apparatus 100 is expanded according to an example embodiment and, for example, may correspond to FIGS. 2B and 3B.

Referring to FIGS. 4 through 7, the electronic apparatus 100 may include a guide rail to guide a moving direction when a relative movement between the first frame 1001 and the second frame 1002 is performed.

The electronic apparatus 100 may include a guide rail (not shown) provided at an inner side of the first frame 1001 and a pipe rail 400 fixed to the second frame 1002 and coupled with the guide rail of the first frame 1001. For example, the guide rail (not shown) may be provided in a form of a groove prepared at the inner side of the first frame 1001 in a shape corresponding to a shape of the pipe rail 400. The pipe rail 400 fixed to the second frame 1002 may slidably move in a first direction (refer to FIGS. 2A through 3B) along the groove of the guide rail (not shown).

The electronic apparatus 100 may include a speaker module 300 (e.g., the audio output part 152 of FIG. 1) fixedly disposed at the first frame 1001.

The speaker module 300 may be located at one side of the electronic apparatus 100 to externally output an acoustic signal.

The speaker module 300 may include a sound emitting hole 310 and a vent hole 320. Although FIGS. 4 through 7 illustrate that the sound emitting hole 310 and the vent hole 320 are formed in a same surface of the speaker module 300, the sound emitting hole 310 and the vent hole 320 may also be formed in different surfaces of the speaker module 300.

The sound emitting hole 310 may be an opening prepared to output an acoustic signal from a front surface of a speaker (not shown) to outside. The acoustic signal may be generated from the speaker (not shown) located at the inner side of the speaker module 300. The sound emitting hole 310 may be disposed to face a speaker hole (not shown) on one of outer surfaces of the electronic apparatus 100 to overlap the speaker hole.

The vent hole 320 may be an opening to externally output a reflected acoustic signal emitted from the inner side of the speaker module 300 in a rearward direction of the speaker (not shown). For example, the vent hole 320 may be located on a surface identical to or different from a surface on which the sound emitting hole 310 is located in the speaker module 300. Also, the vent hole 320 may be spaced apart from the sound emitting hole 310 by a predetermined distance.

In response to the second frame 1002 moving, the pipe rail 400 may integrally move with the second frame 1002. The pipe rail 400 may be disposed such that at least a portion of the pipe rail 400 is in contact with the surface on which the vent hole 320 of the speaker module 300 is located.

The pipe rail 400 may be in a form of a pipe and include a pipeline at the inner side. Also, both ends of the pipe rail 400 may be closed.

The pipe rail 400 may include one or more input holes 420 in a first surface facing the speaker module 300. Also, the pipe rail 400 may include an output hole 440 in a second surface facing an outer surface (e.g., a side surface) of the electronic apparatus 100.

As illustrated in FIG. 4, when a screen output area viewable on the front surface of the electronic apparatus 100, for example, the front surface area 151F of FIG. 2A is reduced, the pipe rail 400 may close the vent hole 320 of the speaker module 300 using the first surface. In this case, an acoustic signal output from the speaker module 300 may be provided to outside through the sound emitting hole 310.

When at least a portion of the front surface area 151F is expanded by relatively moving the second frame 1002 in the first direction in which the distance from the first frame 1001 increases, the pipe rail 400 may integrally move with the second frame 1002 to be apart from the first frame 1001 and the speaker module 300.

Figure 5:
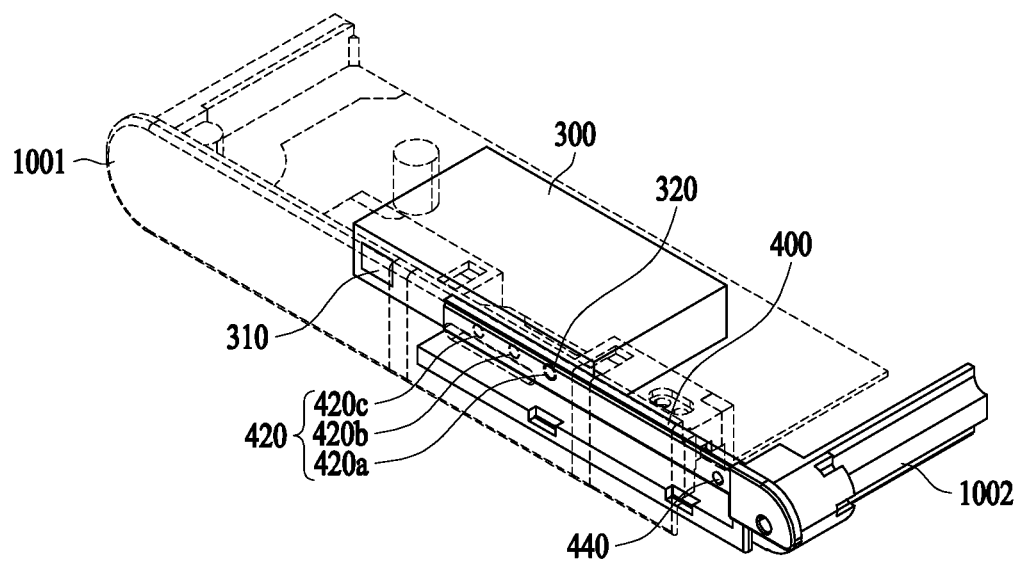
FIG. 5 is a perspective view illustrating an operation of an electronic apparatus according to an example embodiment.
Figure 6:
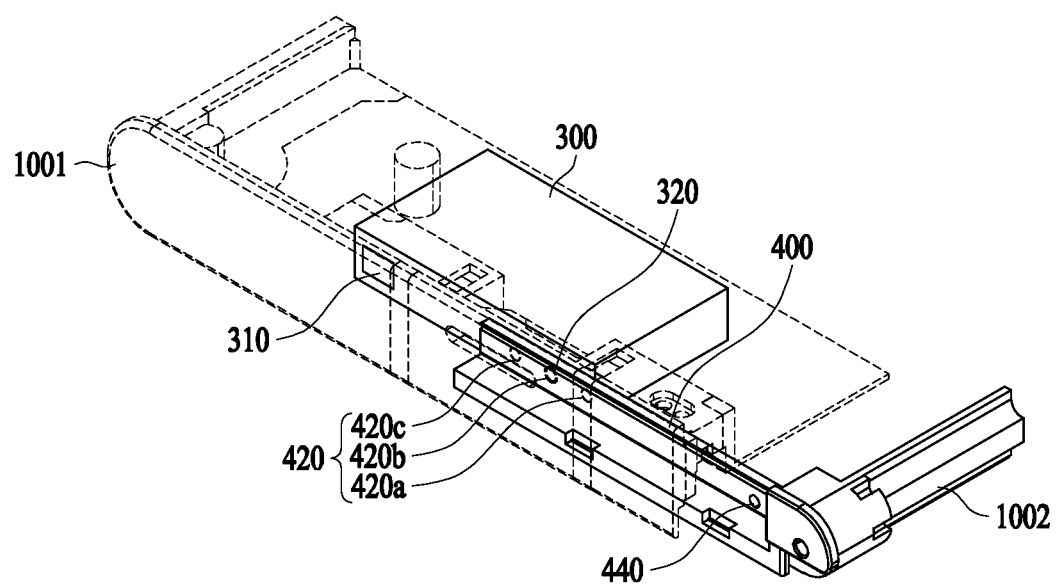
FIG. 6 is a perspective view illustrating an operation of an electronic apparatus according to an example embodiment.

As illustrated in FIGS. 5 through 7, the pipe rail 400 may move in the first direction by a predetermined distance so that one of the one or more input holes 420 of the pipe rail 400 overlaps the vent hole 320. Also, the output hole 440 of the pipe rail 400 may overlap a second speaker hole (not shown) provided in the outer surface of the second frame 1002.

For example, when the pipe rail 400 moves in the first direction by the predetermined distance, the acoustic signal output through the vent hole 320 may be transferred to one of the input holes 420 of the pipe rail 400. The acoustic signal entering through one of the input holes 420 may move along an inner pipeline of the pipe rail 400 and be provided to outside through the output hole 440.

As such, the pipe rail 400 may selectively provide the acoustic signal from the vent hole 320 to outside through the pipe rail based on whether the screen output area on the front surface of the electronic apparatus 100 is expanded.

For example, as illustrated in FIG. 4, when the screen output area on the front surface is reduced, the acoustic signal from the vent hole 320 may not be output to outside. Also, as illustrated in FIGS. 5 through 7, when the screen output area on the front surface is expanded, the acoustic signal from the vent hole 320 may be output to outside.

According to various embodiments, the pipe rail 400 may include a plurality of input holes, for example, a first input hole 420a, a second input hole 420b, and a third input hole 420c to overlap the vent hole 320 in response to the relative movement of the second frame 1002.

For example, in a state in which the screen output area of the front surface of the electronic apparatus 100 is maximally reduced as illustrated in FIG. 4, the second frame 1002 and the pipe rail 400 may move by a first interval in a direction in which a distance from the first frame 1001 increases to partially expand the screen output area. In this example, the vent hole 320 closed by the pipe rail 400 may be located to overlap the first input hole 420a as illustrated in FIG. 5.

When the second frame 1002 and the pipe rail 400 move by a second interval to further expand the screen output area on the front surface, the vent hole 320 may overlap the second input hole 420b as illustrated in FIG. 6.

When the second frame 1002 and the pipe rail 400 move by a third interval to maximally expand the screen output area on the front surface, the vent hole 320 may overlap the third input hole 420c as illustrated in FIG. 7.

According to various embodiments, the pipe rail 400 may differently provide a movement output path of the acoustic signal from the vent hole 320 based on a degree to which the screen output area on the front surface of the electronic apparatus 100 is expanded.

For example, based on an expansion degree of the screen output area on the front surface of the electronic apparatus 100, the vent hole 320 of the speaker module 300 may overlap the different input holes 420. Acoustic signals entering through the different input holes 420 may move by different lengths at the inner side of the pipe rail 400, and then be output to the output hole 440. That is, the pipe rail 400 may form acoustic output paths corresponding to lengths from the input holes 420 overlapping the vent hole 320 to the output hole 440.

For example, when the vent hole 320 overlaps the first input hole 420a in response to the second frame 1002 moving as illustrated in FIG. 5, an acoustic output path of an acoustic signal provided from the vent hole 320 through an inner pipeline of the pipe rail 400 may be shorter than an acoustic output path provided in a case in which the vent hole 320 overlaps the third input hole 420c as illustrated in FIG. 7.

As such, the electronic apparatus 100 may provide different acoustic output paths based on an expansion degree of the screen output area on the front surface, thereby outputting an acoustic signal having an appropriate characteristic in connection with a size of a screen output area of the display 151.

Figure 8:
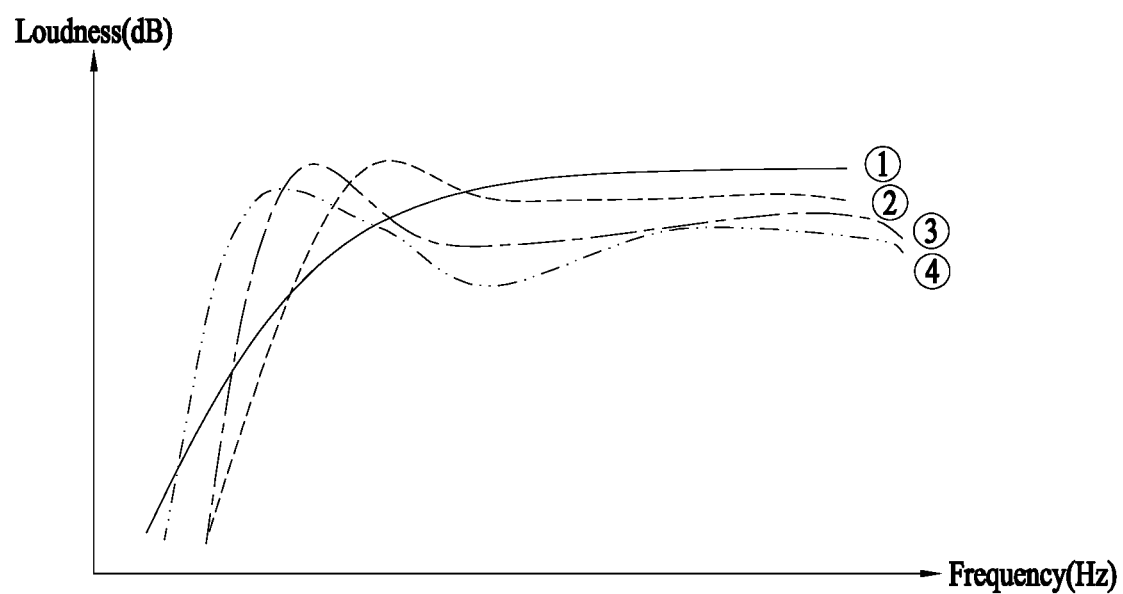
FIG. 8 illustrates graphs for explaining characteristics of an acoustic signal of an electronic apparatus according to various embodiments.

FIG. 8 illustrates graphs for explaining characteristics of an acoustic signal output from an electronic apparatus according to various embodiments.

Referring to FIG. 8, the electronic apparatus 100 may output an acoustic signal having low-pass characteristics enhanced according to an expansion of a screen output area on a front surface of the electronic apparatus 100.

Graphs ① through ④ of FIG. 8 may be understood as acoustic characteristic graphs obtained at positions of the pipe rail 400 illustrated in FIGS. 4 through 7.

Referring to the graph ① and FIG. 4, an acoustic signal may be output using the sound emitting hole 310 of the speaker module 300. In this case, the electronic apparatus 100 may output an acoustic signal with an evenly high sound pressure in intermediate-bass and high-bass frequency bands.

Referring to the graph ② and FIG. 5, when an acoustic signal is to be output through the sound emitting hole 310 together with an acoustic signal output from the vent hole 320, the electronic apparatus 100 may output an acoustic signal in which a low-bass frequency band is relatively enhanced.

Referring to the graph ③ and FIG. 6, and the graph ④ and FIG. 7, according to an increase in a length of an inner pipeline of a pipe rail through which an acoustic signal from the vent hole 320 passes, a low bass of the acoustic signal may be enhanced in a lower frequency band.

According to example embodiments of the present disclosure, the electronic apparatus 100 may output an even acoustic signal in a state in which a front-face screen output area is reduced and output a low bass-enhanced acoustic signal in a state in which the front-face screen output area is expanded, thereby providing different acoustic characteristics in connection with a size of the screen output area.

Figure 9:
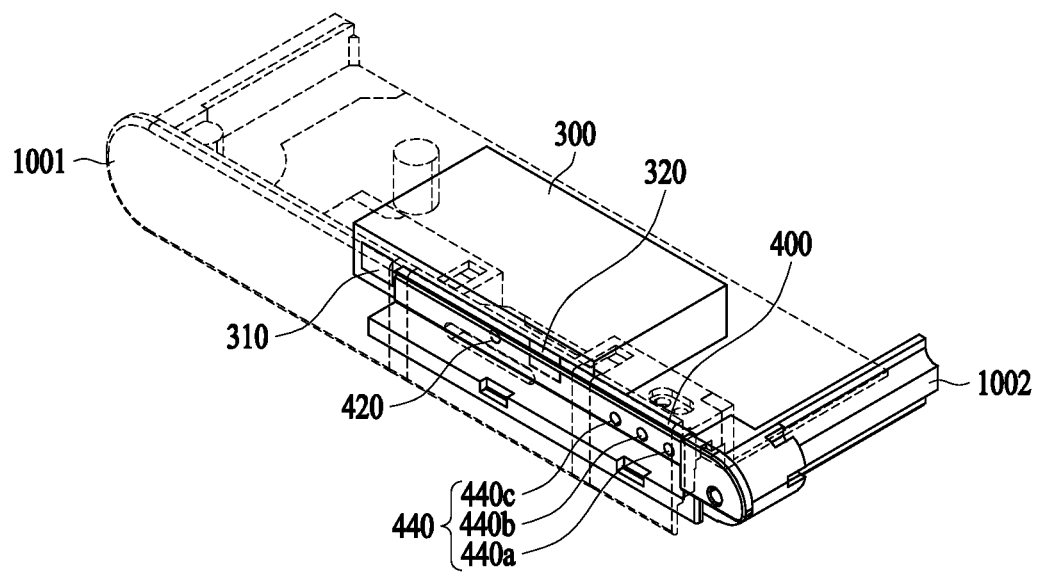
FIG. 9 is a perspective view illustrating an operation of an electronic apparatus according to an example embodiment.
Figure 10:
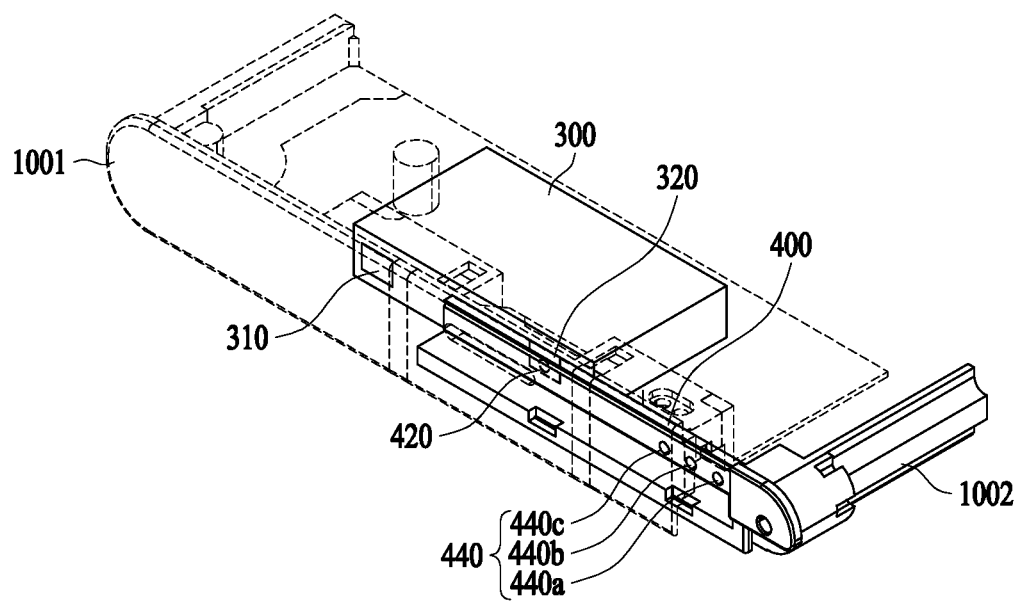
FIG. 10 is a perspective view illustrating an operation of an electronic apparatus according to an example embodiment.

FIGS. 9 and 10 are diagrams illustrating an operation of the electronic apparatus 100 according to an example embodiment.

Referring to FIGS. 9 and 10, in contrast to the example embodiment described with reference to the pipe rail 400, at least one input hole 420 may be included in a first surface facing the vent hole 320 of the speaker module 300 and a plurality of output holes 440 may be included in a second surface facing in a direction opposite to the first surface.

In the electronic apparatus 100, the second frame 1002 may be disposed to overlap a portion of the first frame 1001. When a screen output area of the display 151 viewable on a front surface of the electronic apparatus 100 is reduced, as illustrated in FIG. 9, the first surface of the pipe rail 400 may be located to close the vent hole 320 and the vent hole 320 and the input hole 420 may not overlap each other. In this case, the electronic apparatus 100 may output an acoustic signal using the sound emitting hole 310.

When the second frame 1002 moves relative to the first frame 1001 to be apart from the second frame 1002, that is, when the screen output area on the front surface of the electronic apparatus 100 is expanded, the vent hole 320 may overlap the input hole 420 as illustrated in FIG. 10.

An acoustic signal introduced into the pipe rail 400 through the vent hole 320 and the input hole 420 of the speaker module 300 may be reflected along an inner pipeline of the pipe rail 400 and transferred to outside through at least one of the output holes 440.

In the electronic apparatus 100 according to example embodiments, based on an arrangement and design of the first frame 1001 and the second frame 1002, more output holes 440 may overlap a speaker hole (not shown) as the screen output area on the front surface of the electronic apparatus 100 is more expanded.

According to example embodiments, an electronic apparatus may selectively expand or reduce a screen output area of a display, thereby providing a large-area screen to a user as necessary while securing an ease of portability. In addition, it is possible to provide an improved acoustic performance without need to use an additional member related to a speaker module and an unnecessary space.

According to example embodiments, it is possible to provide an electronic apparatus that prepares different acoustic paths based on whether a screen output area of a flexible display is expanded or an expansion degree of the screen output area, thereby providing an acoustic feature suitable for a circumstance of a user.

Although exemplary embodiments of the present disclosure have been described for illustrative purposes, those skilled in the art will appreciate that various modifications, additions, and substitutions are possible, without departing from the essential characteristics of the disclosure. Therefore, exemplary embodiments of the present disclosure have been described for the sake of brevity and clarity. Accordingly, those skilled in the art will understand that the scope of the disclosure is not limited by the explicitly described above embodiments but by the claims and equivalents thereof.

What is claimed is:

1. An electronic apparatus comprising:
a first frame;
a second frame configured to be moved relative to the first frame in first and second directions;
a flexible display comprising a screen output area that is relatively increased or relatively decreased based on which of the first direction or the second direction the second frame is moved relative to the first frame, wherein the screen output area is located on a first side of the electronic apparatus;
a speaker module disposed at the first frame and comprising a speaker and a vent hole; and
a pipe rail disposed at the second frame and comprising an inner pipeline,
wherein the pipe rail is structured to selectively permit transfer of an acoustic output emitted by the speaker through the vent hole and the inner pipeline, based on the second frame being moved relative to the first frame.

2. The electronic apparatus of claim 1, wherein the pipe rail further comprises:
one or more input holes formed in a first side of the pipe rail facing the speaker module; and
an output hole formed in a second side of the pipe rail facing a second side of the electronic apparatus.

3. The electronic apparatus of claim 1, wherein the pipe rail is positioned to close the vent hole when the screen output area is relatively decreased, and
wherein the pipe rail is positioned such that the acoustic output is transferred from the vent hole through the inner pipeline to outside when the screen output area is relatively increased.

4. The electronic apparatus of claim 1, wherein the pipe rail is further structured to provide an acoustic output path for the acoustic output differently based on a degree of the increase when the screen output area is relatively increased.

5. The electronic apparatus of claim 2, wherein the pipe rail is positioned such that one of the one or more input holes overlaps the vent hole when the screen output area is relatively increased due to the movement of the second frame relative to the first frame.

6. The electronic apparatus of claim 5, wherein the pipe rail is further structured to form an acoustic output path, a length of the acoustic output path corresponding to a length from the one input hole overlapping the vent hole to the output hole.

7. The electronic apparatus of claim 2, wherein:
the speaker module further comprises a sound emitting hole;
the acoustic output is transferred through the sound emitting hole when the screen output area is relatively decreased; and
the acoustic output is transferred through the sound emitting hole and the output hole when the screen output area is relatively increased.

8. The electronic apparatus of claim 2, wherein a length between the output hole and the vent hole is greater than a length between the vent hole and the one or more input holes.

9. The electronic apparatus of claim 1, wherein one side of the speaker module having the vent hole further has a sound emitting hole and the one side of the speaker module faces a second side of the electronic apparatus.

10. The electronic apparatus of claim 1, wherein the pipe rail further comprises:
an input hole on a first side of the pipe rail facing the speaker module; and a plurality of output holes on a second side of the pipe rail facing a second side of the electronic apparatus, wherein at least a portion of the plurality of output holes is opened based on the second frame being moved relative to the first frame such that the screen output area is relatively increased.

11. The electronic apparatus of claim 1, further comprising a guide rail at an inner side of the first frame, wherein the pipe rail fixed to the second frame is coupled with the guide rail of the first frame.

12. The electronic apparatus of claim 11, wherein a groove corresponding to a shape of the pipe rail is formed at the guide rail.

13. The electronic apparatus of claim 12, wherein the pipe rail is configured to be slidably moved along the groove of the guide rail.

14. An electronic apparatus comprising:

a first frame;

a second frame configured to be moved relative to the first frame in first and second directions;

a flexible display comprising a screen output area on a first side of the electronic apparatus, wherein the screen output area is relatively increased or relatively decreased based on which of the first direction or the second direction the second frame is moved relative to the first frame;

a speaker module fixedly disposed at the first frame and comprising a speaker and a vent hole; and a pipe rail fixedly disposed at the second frame and comprising an inner pipeline, wherein the pipe rail is structured to provide an output path for an acoustic output emitted by the speaker and transferred through the vent hole and the inner pipeline when the screen output area is relatively increased, the output path provided differently based on a degree of the relative increase of the screen output area.

15. The electronic apparatus of claim 14, wherein the pipe rail further comprises:

a plurality of input holes on a first side of the pipe rail facing the speaker module; and at least one output hole on a second side of the pipe rail facing a second side of the electronic apparatus.

16. The electronic apparatus of claim 15, wherein the pipe rail is positioned such that one of the plurality of input holes overlaps the vent hole when the screen output area is relatively increased.

17. The electronic apparatus of claim 16, wherein the output path includes an inner pipeline extending from the one input hole overlapping the vent hole to the at least one output hole.

18. The electronic apparatus of claim 16, wherein the pipe rail is positioned such that the output path is increased in length according to an increased size of the screen output area that is relatively increased.

19. The electronic apparatus of claim 14, wherein:

the speaker module further comprises a sound emitting hole;

the pipe rail further comprises an input hole; and the acoustic output is emitted through the sound emitting hole when the pipe rail is positioned such that the vent hole and the input hole do not overlap each other.

20. The electronic apparatus of claim 19, wherein:

the pipe rail further comprises a plurality of output holes; and the acoustic output is emitted through at least one of the plurality of output holes when the second frame is moved relative to the first frame such that the screen output area is relatively increased and the vent hole overlaps the input hole.

* * * * *